June 26, 1934.   C. GOODALL   1,964,115
DRYING OF TIMBER AND OTHER MATERIALS
Filed April 25, 1933   2 Sheets-Sheet 1

C. Goodall
INVENTOR

By Marks & Clerk
Attys.

June 26, 1934.  C. GOODALL  1,964,115
DRYING OF TIMBER AND OTHER MATERIALS
Filed April 25, 1933  2 Sheets-Sheet 2

C. Goodall
INVENTOR

By: Marks & Clerk
Attys.

Patented June 26, 1934

1,964,115

UNITED STATES PATENT OFFICE 1,964,115

DRYING OF TIMBER AND OTHER MATERIALS

Charles Goodall, Tutbury, Burton-on-Trent, England

Application April 25, 1933, Serial No. 667,904
In Great Britain May 3, 1932

1 Claim. (Cl. 34—46)

This invention relates to apparatus employed for the drying of timber and other materials, the apparatus being of the kind comprising a chamber in which the timber or the like to be dried can be suitably stacked or otherwise suitably arranged, and means for effecting circulation of air through the chamber.

The present invention has for its object to provide improved means for producing the required air flow uniformly over all parts of the material contained within the chamber.

The invention consists in a drying chamber in which the material to be dried is supported so that there is a clear air space at all sides of the material, and in which a relatively high velocity air stream (motive stream) is produced along one side of the chamber immediately adjacent to spaces between the material, so that a flow of air is induced through the said spaces by the motive stream.

In the two accompanying sheets of explanatory drawings:—

Figure 1:
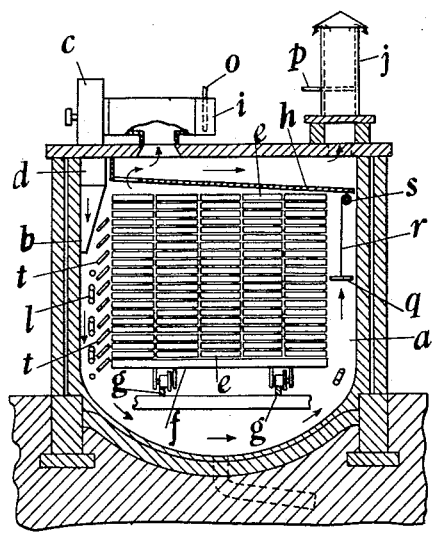
Figure 2:
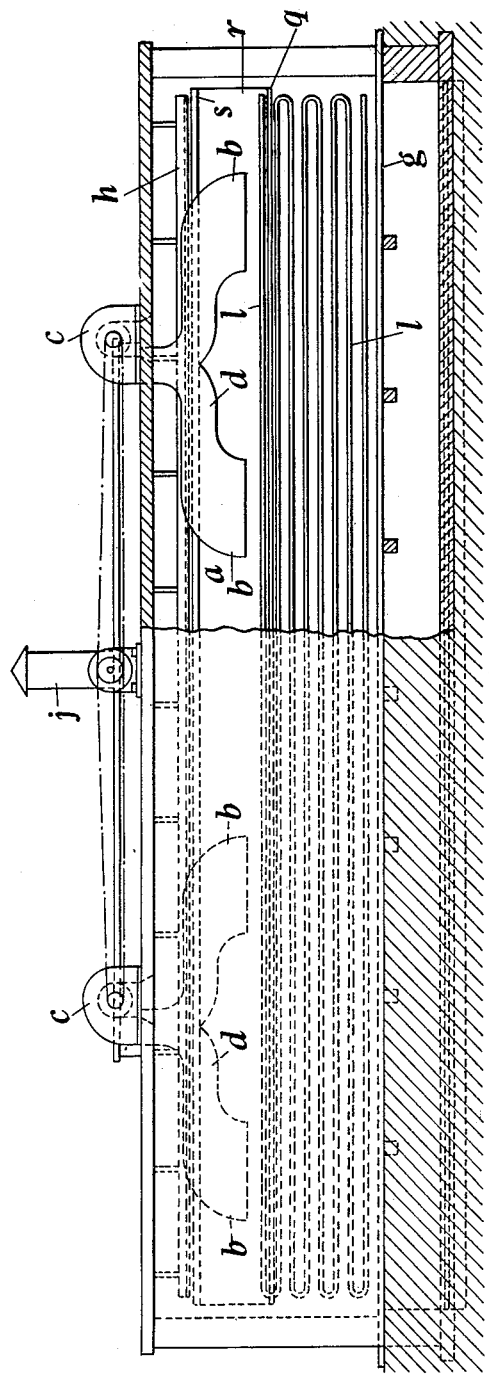
Figure 3:
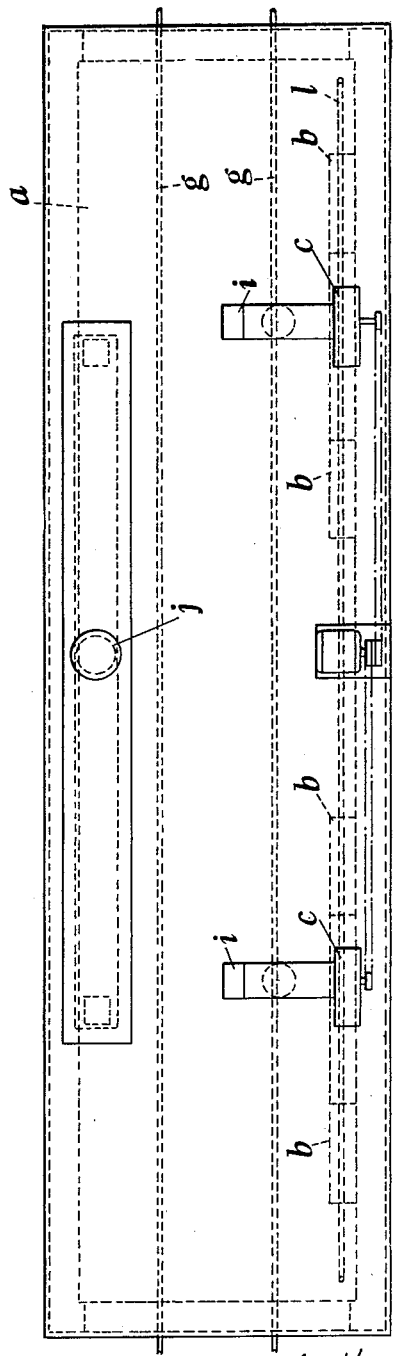

Figure 1 is a cross section of a drying chamber provided with this invention, Figure 2 is a longitudinal section, and Figure 3 a plan of the chamber.

In carrying the present invention into effect as shown, for the drying of timber, I employ a brick or other horizontal chamber $a$ of any convenient rectangular form. At the upper end of one of the vertical walls of the chamber is arranged a nozzle $b$, or a plurality of such nozzles spaced at suitable intervals along the said wall of the chamber. Vertically downwards along the inner side of this wall a high velocity stream of air (the motive stream) is caused to flow. The vertical air flow may be obtained by means of one or a plurality of forced draught fans or blowers $c$ situated above the chamber or in any other convenient position. Preferably the fan or fans deliver their air into a horizontal duct or ducts $d$ situated in the upper part of the chamber, this duct being formed at its under side with an opening or openings forming the nozzles whereby a uniform air stream can be caused to flow down the vertical side of the chamber.

The timber $e$ to be dried may be stacked horizontally by means of spacing members (not shown) on wheeled trucks $f$ which can be rolled on rails $g$ situated in the base of the chamber, suitable horizontal spaces being provided in the timber stack to allow the required free flow of air through the stack. Suitable air spaces are provided between the two sides of the stack and the adjacent vertical walls. Also the rails are so arranged that there is a clear air space beneath them as shown. It will be noticed that the spaces between the timbers at one side of the stack are immediately adjacent to the motive stream.

When in action the motive stream causes a horizontal air flow to be set up uniformly through the horizontal spaces in the stack. This air joins the motive stream and is carried forward by it. When the stream reaches the base of the chamber it is deflected by the concave inner surface of the base and caused to pass along the space aforesaid provided in the base beneath the stack, and from this space the air flows upwards past the side of the stack remote from the nozzles to the upper part of the chamber, some of this ascending air being drawn by the action above described through the spaces between the timbers.

From the top of the chamber the air flows through a false ceiling $h$ or screen to the suction pipe of the fan or fans and is afterwards returned to the chamber. Preferably the suction pipe has combined with it a fresh air inlet $i$ which is controlled by a suitable damper $o$ so that fresh air as well as air drawn from the chamber may be delivered to the chamber in variable proportions. When fresh air is admitted to the fan or fans, excess air from the chamber is allowed to escape to the outer atmosphere through a vent $j$ in the upper part of the chamber, which is controlled by a damper $p$.

It will be apparent that the humidity of the air within the chamber can be conveniently regulated by means of the damper which controls the supply of fresh air to the fan or fans. In the initial stages of a drying operation the damper is closed and only that air originally contained in the chamber is circulated past the timber. When this air becomes saturated by moisture taken up from the timber, the damper is slightly opened to admit a suitable amount of fresh air, the damper being fully opened if desired towards the end of the drying operation. Excess air from the chamber then escapes through the damper $p$.

At the side of the chamber remote from that at which the motive air enters, a suspended baffle $q$ is arranged, this being raised or lowered as required by means of a flexible suspension $r$ attached to a rotary spindle $s$. By raising or lowering the baffle the air stream in the rising side of the chamber can be checked so that a greater proportion of air can be caused to flow through the parts of the timber lying below the baffle. This device affords a useful control over the drying operation.

To expedite the drying it is preferable to heat the air within the chamber and this may be conveniently effected by means of steam or hot water pipes $l$ arranged at either or both sides of the stack. The pipes also effect a certain amount of direct heating of the stack.

The inducing action of the motive stream on the air between the timbers may be augmented by the arrangement between the motive stream and the timber stack of a series of downwardly inclined slats $t$ (Figure 1), but for many purposes the assistance of the slats is unnecessary.

By this invention I am able to effect the required induced air flow through all parts of the timber stack placed within the chamber in a very simple, economical and reliable manner. The invention is not limited to the example above described as subordinate details can be varied to meet different requirements. Whilst primarily intended for the drying of timber the invention may be applied to the drying of other material which can be so arranged in the chamber as to provide spaces or interstices through which air currents can be induced.

Having thus described my invention what I claim as new and desire to secure by Letters Patent is:—

Apparatus for drying timber and other materials, comprising a drying chamber having a pair of vertical walls and having a base provided with a concave inner surface, means for producing a relatively high velocity air flow in a downward direction along the inner surface of one of the said walls, and a vertically movable baffle arranged adjacent to the inner surface of the other of the said walls, substantially as described.

CHARLES GOODALL.